United States Patent
Furumura et al.

(10) Patent No.: US 8,933,784 B2
(45) Date of Patent: Jan. 13, 2015

(54) RF POWDER PARTICLE, RF POWDER, AND RF POWDER-CONTAINING BASE

(75) Inventors: Yuji Furumura, Yokohama (JP); Naomi Mura, Tokyo (JP); Shinji Nishihara, Kokubunji (JP); Katsuhiro Fujino, Yokohama (JP); Katsuhiko Mishima, Yokohama (JP); Susumu Kamihashi, Yokohama (JP)

(73) Assignee: Philtech Inc., Tokyo (JP)

( * ) Notice: Subject to any disclaimer, the term of this patent is extended or adjusted under 35 U.S.C. 154(b) by 670 days.

(21) Appl. No.: 12/516,643

(22) PCT Filed: Nov. 26, 2007

(86) PCT No.: PCT/JP2007/072750
§ 371 (c)(1),
(2), (4) Date: Oct. 19, 2009

(87) PCT Pub. No.: WO2008/065992
PCT Pub. Date: Jun. 5, 2008

(65) Prior Publication Data
US 2010/0067166 A1 Mar. 18, 2010

(30) Foreign Application Priority Data
Nov. 28, 2006 (JP) .................... 2006-320337

(51) Int. Cl.
*G05B 19/00* (2006.01)
*H04Q 5/22* (2006.01)
(Continued)

(52) U.S. Cl.
CPC ........ *H04B 5/0012* (2013.01); *G06K 19/07749* (2013.01); *G06K 19/07775* (2013.01);
(Continued)

(58) Field of Classification Search
CPC .......... G06K 19/072; G06K 19/07749; G06K 19/07779; G06K 19/07775; G06K 19/0723; G06K 19/07767; G06K 19/0704; G06K 19/07756; G06K 19/07783; G07D 7/0093; G07D 7/04; H01Q 1/2208; H01Q 9/16; H01Q 9/27

USPC ........... 340/5.86, 572.1, 572.4, 572.7, 572.8, 340/573.1, 10, 10.3, 10.4, 10.51; 235/492, 235/451; 257/679, 777, 778, 773, 763; 434/700, 702
See application file for complete search history.

(56) References Cited

U.S. PATENT DOCUMENTS

| | | |
|---|---|---|
| 3,946,206 A | 3/1976 | Darjany |
| 4,058,839 A | 11/1977 | Darjany |

(Continued)

FOREIGN PATENT DOCUMENTS

| | | |
|---|---|---|
| JP | 61-006783 | 1/1986 |
| JP | 63-112198 | 5/1988 |

(Continued)

OTHER PUBLICATIONS
Author: Pran Kanai Saha et al. Title: A CMOS Monocycle Pulse Generation Circuit in a Ultra-Wideband Transmitter for Intra/Inter Chip Wireless Interconnection. Japanese Journal of Applied Physics vol. 44 No. 4B, 2005, pp. 2104-2108.*

(Continued)

*Primary Examiner* — Daniel Wu
*Assistant Examiner* — Mancil Littlejohn, Jr.
(74) *Attorney, Agent, or Firm* — Foley & Lardner LLP

(57) ABSTRACT

Provided are an RF powder particle, an RF powder, and an RF powder-containing base that can make it difficult to fabricate, for example, forged documents or forged bank notes with respect to sheet-like objects having high proprietary values, such as bank notes, and that allow necessary information to be stored in each of the large number of particles which are each provided with a tank circuit having a predetermined resonant frequency.
The RF powder particle includes a coil 24 (inductance element) as a magnetic filed coupling element and a condenser 25 (capacitance element) connected to the both ends of the coil on an insulating surface of a substrate 22 and is configured so as to form a tank circuit 31 by the inductance element and the capacitance element. The tank circuit 31 functions as a circuit in a resonance state or in a non-resonance state in accordance with conditions in response to a high-frequency magnetic field from outside.

20 Claims, 16 Drawing Sheets

(51) Int. Cl.

| | | |
|---|---|---|
| *G08B 23/00* | (2006.01) | |
| *H04B 5/00* | (2006.01) | |
| *G06K 19/077* | (2006.01) | |
| *G07D 7/00* | (2006.01) | |
| *H01Q 1/38* | (2006.01) | |
| *H01Q 7/00* | (2006.01) | |
| *H04B 5/02* | (2006.01) | |
| *H01Q 1/22* | (2006.01) | |

(52) U.S. Cl.
CPC ........ *G06K19/07779* (2013.01); *G07D 7/0093* (2013.01); *H01Q 1/38* (2013.01); *H01Q 7/005* (2013.01); *H04B 5/02* (2013.01); *H01Q 1/2283* (2013.01); *H04B 5/0081* (2013.01)
USPC ... 340/5.86; 340/10.1; 340/10.42; 340/572.1; 340/572.5

(56) References Cited

U.S. PATENT DOCUMENTS

| | | | |
|---|---|---|---|
| 4,745,401 A | 5/1988 | Montean | |
| 5,204,681 A | 4/1993 | Greene | |
| 5,291,205 A | 3/1994 | Greene | |
| 5,497,952 A | 3/1996 | Iding | |
| 5,518,937 A | 5/1996 | Furumura et al. | |
| 5,581,257 A | 12/1996 | Greene et al. | |
| 5,808,587 A | 9/1998 | Shima | |
| 6,072,394 A * | 6/2000 | Hasegawa et al. | 340/572.5 |
| 6,285,284 B1 | 9/2001 | Soe et al. | |
| 6,445,271 B1 * | 9/2002 | Johnson | 336/200 |
| 6,479,384 B2 | 11/2002 | Komai et al. | |
| 6,642,827 B1 | 11/2003 | McWilliams et al. | |
| 6,758,397 B2 | 7/2004 | Catan | |
| 6,966,488 B2 | 11/2005 | Yamagami | |
| 6,998,696 B2 * | 2/2006 | Casper et al. | 257/528 |
| 7,061,083 B1 * | 6/2006 | Usami et al. | 257/679 |
| 7,102,522 B2 | 9/2006 | Kuhns | |
| 7,158,033 B2 | 1/2007 | Forster | |
| 7,227,504 B2 | 6/2007 | Deguchi et al. | |
| 7,288,320 B2 | 10/2007 | Steenblik et al. | |
| 7,305,223 B2 * | 12/2007 | Liu et al. | 455/333 |
| 7,317,420 B2 | 1/2008 | Aisenbrey | |
| 7,405,665 B2 * | 7/2008 | Yamazaki | 340/572.8 |
| 7,427,577 B2 | 9/2008 | Tang et al. | |
| 7,508,305 B2 | 3/2009 | Yamazaki et al. | |
| 7,551,054 B2 * | 6/2009 | Mizuno et al. | 336/200 |
| 7,557,757 B2 | 7/2009 | Deavours et al. | |
| 7,623,036 B2 | 11/2009 | Onderko et al. | |
| 7,767,551 B2 | 8/2010 | Arita et al. | |
| 7,876,189 B2 | 1/2011 | Gilmartin et al. | |
| 7,893,837 B2 | 2/2011 | Yamazaki et al. | |
| 7,984,849 B2 | 7/2011 | Berghel et al. | |
| 7,990,137 B2 | 8/2011 | Antoku | |
| 2002/0163479 A1 | 11/2002 | Lin et al. | |
| 2003/0037240 A1 | 2/2003 | Yamagishi et al. | |
| 2003/0095032 A1 | 5/2003 | Hoshino et al. | |
| 2003/0136828 A1 | 7/2003 | Takesada et al. | |
| 2005/0194591 A1 | 9/2005 | Usami et al. | |
| 2006/0044111 A1 | 3/2006 | Kollar et al. | |
| 2006/0044769 A1 | 3/2006 | Forster et al. | |
| 2006/0202269 A1 | 9/2006 | Suzuki et al. | |
| 2007/0138251 A1 | 6/2007 | Mattlin et al. | |
| 2007/0176622 A1 | 8/2007 | Yamazaki | |
| 2007/0210364 A1 | 9/2007 | Kato et al. | |
| 2008/0042168 A1 | 2/2008 | Watanabe et al. | |
| 2008/0130018 A1 | 6/2008 | Steenblik et al. | |
| 2008/0303735 A1 | 12/2008 | Fujimoto et al. | |
| 2009/0206151 A1 | 8/2009 | Morita | |
| 2010/0026441 A1 | 2/2010 | Wedley | |
| 2010/0066619 A1 | 3/2010 | Furumura et al. | |
| 2010/0067166 A1 | 3/2010 | Furumura et al. | |
| 2011/0063184 A1 | 3/2011 | Furumura et al. | |

FOREIGN PATENT DOCUMENTS

| | | | |
|---|---|---|---|
| JP | 63-261851 | 10/1988 | |
| JP | 03-087027 | 4/1991 | |
| JP | 05-101249 | 4/1993 | |
| JP | 06-350495 | 12/1994 | |
| JP | 07-263935 | 10/1995 | |
| JP | 08-022514 | 1/1996 | |
| JP | 08-305970 | 11/1996 | |
| JP | 2008-305970 | 11/1996 | |
| JP | 10-069533 | 3/1998 | |
| JP | 10-171951 | 6/1998 | |
| JP | 11-328493 | 11/1999 | |
| JP | 2000-269166 | 9/2000 | |
| JP | 2001-230220 | 8/2001 | |
| JP | 2002-271122 | 9/2002 | |
| JP | 2002-333913 | 11/2002 | |
| JP | 2003-058659 | 2/2003 | |
| JP | 2003-087044 | 3/2003 | |
| JP | 2003-157477 | 5/2003 | |
| JP | 2003-179005 | 6/2003 | |
| JP | 2003-187195 | 7/2003 | |
| JP | 2003-216908 | 7/2003 | |
| JP | 2003-242472 | 8/2003 | |
| JP | 2004-079746 | 3/2004 | |
| JP | 2004-139405 | 5/2004 | |
| JP | 2004-159960 | 6/2004 | |
| JP | 2005-020058 | 1/2005 | |
| JP | 2005-050997 | 2/2005 | |
| JP | 2005-183741 | 7/2005 | |
| JP | 2005-197630 | 7/2005 | |
| JP | 2005-208775 | 8/2005 | |
| JP | 2005-216099 | 8/2005 | |
| JP | 2005208775 A * | 8/2005 | G06K 19/07 |
| JP | 2005-284333 | 10/2005 | |
| JP | 2005-285109 | 10/2005 | |
| JP | 2005-340658 | 12/2005 | |
| JP | 2005-340791 | 12/2005 | |
| JP | 2006-012086 | 1/2006 | |
| JP | 2006-027745 | 2/2006 | |
| JP | 2006-041986 | 2/2006 | |
| JP | 2006-066899 | 3/2006 | |
| JP | 2006-180043 | 7/2006 | |
| JP | 2006-203852 | 8/2006 | |
| JP | 2006-277667 | 10/2006 | |
| JP | 2006-285958 | 10/2006 | |
| WO | WO-00/36555 | 6/2000 | |
| WO | WO 00/36555 | 6/2000 | |
| WO | WO 2008/099955 | 8/2008 | |

OTHER PUBLICATIONS

International Preliminary Report on Patentability for PCT/JP2007/072750 mailed Jun. 11, 2009.
Non-Final Office Action for U.S. Appl. No. 12/516,500, mailed on Sep. 29, 2011, 15 pp.
Non-Final Office Action for U.S. Appl. No. 12/521,244, mailed on Nov. 8, 2011, 11 pp.
Notice of Allowance of U.S. Appl. No. 12/516,493, mailed on Oct. 17, 2011, 14 pp.
Non-Final Office Action for U.S. Appl. No. 12/516,497, mailed on Nov. 21, 2011, 10 pp.
International Preliminary Report on Patentability issued Jun. 3, 2009 for PCT/JP2007/072749 (English translation).
International Preliminary Report on Patentability issued Jun. 3, 2009 for PCT/JP2007/072750 (English translation).
International Preliminary Report on Patentability issued Jun. 3, 2009 for PCT/JP2007/072751 (English Translation).
International Preliminary Report on Patentability issued Jun. 3, 2009 for PCT/JP2007/072752 (English translation).
International Preliminary Report on Patentability issued Jun. 3, 2009 for PCT/JP2007/072746 (English Translation).
International Search Report mailed Feb. 19, 2008 for PCT/JP2007/072746 (English translation).
International Preliminary Report on Patentability issued Jul. 9, 2009 for PCT/JP2007/074108 (English translation).

(56) References Cited

OTHER PUBLICATIONS

Usami, Mitsuo, An ultrasmall RFID chip:m-chip, Oyo Buturi, vol. 73, No. 9, pp. 1179-1183 (2004).
Usami,Mitsuo, et al., Ubiquitous Technology IC Tag, first edition, Ohmsha, Ltd., pp. 115, Mar. 15, 2005.
Non-final Office Action received for U.S. Appl. No. 12/516,500 dated Feb. 3, 2012.
Notice of Allowance received for U.S. Appl. No. 12/516,493 dated Feb. 23, 2012.
Non-final Office Action received for U.S. Appl. No. 12/516,705 dated Mar. 19, 2012.
Hitachi Pamphlet, World's smallest and thinnest 0.15 × 0.15 mm, 7.51-lm thick RFID IC chip, Feb. 6, 2006, http://www.hitachi.com/New/cnews/060206.html, 3 pages.
Notice of Allowance for U.S. Appl. No. 12/516,705, mailed on Jul. 18, 2012, 9 pp.
Notice of Allowance for U.S. Appl. No. 12/516,500, mailed on Oct. 26, 2012, 9 pp.
Notice of Allowance for U.S. Appl. No. 12/516,500, mailed on Feb. 26, 2013, 10 pp.
Non-Final Office Action issued for U.S. Appl. No. 12/516,648, mailed on May 31, 2013, 29 pp.
Non-final Office Action received for U.S. Appl. No. 12/516,715 dated Sep. 16, 2013.
International Search Report for Intl. Pat. Appln. No. PCT/JP2007/074108, mailed on Feb. 12, 2008, 1 page.
Non-Final Office Action issued for U.S. Appl. No. 12/516,497, mailed on Oct. 1, 2013, 16 pp.
Saha, et al., "A CMOS Monocycle Pulse Generation Circuit in a Ultra-Wideband Transmitter for Intra/Inter Chip Wireless Interconnection," Japanese Journal of Applied Physics, 2005, vol. 44, No. 4B, pp. 2104-2108.
"RFID 'Powder'—World's Smallest RFID Tag," Hitachi, Technovelgy LLC, Feb. 14, 2007, http://www.technovelgy.com/ct/Science-Fiction-News.asp?NewsNum=939, 3 pp.
International Preliminary Report on Patentability for PCT/JP2007/072747, mailed Jun. 11, 2009 (English Translation).
International Preliminary Report on Patentability for PCT/JP2007/072748, mailed Jun. 11, 2009 (English Translation).
International Search Report and Written Opinion for PCT/JP2007/072747, mailed Jan. 29, 2008 (English Translation).
International Search Report and Written Opinion for PCT/JP2007/072748, mailed Feb. 19, 2008 (English Translation).
International Search Report and Written Opinion for PCT/JP2007/072749 mailed Feb. 19, 2008 (English Translation).
International Search Report and Written Opinion for PCT/JP2007/072750, mailed Feb. 26, 2008 (English Translation).
International Search Report and Written Opinion for PCT/JP2007/072751, mailed Feb. 5, 2008 (English Translation).
International Search Report and Written Opinion for PCT/JP2007/072752, mailed Feb. 12, 2008 (English Translation).
Junko Yoshida, "Euro bank notes to embed RFID chips by 2005," EETimes News and Analysis, Dec. 19, 2001, http://www.eetimes.com/story/OEG20011219S0016, 3 pp.
Li Yang et al., "Design and Development of Novel Miniaturized UHF RFID Tags on Ultra-low-cost Paper-based Substrates," Proceedings of Asia-Pacific Microwave Conference 2006, vol. 12, Issue 15, Dec. 2006, pp. 1493-1496.
N Mura et al., "RF-Powder : Fabrication of 0.15-mm Si-powder Resonating at Microwave Frequencies," IEEE European Microwave Conference, 2007, vol. 9 , Issue 12, Oct. 2007, pp. 392-395.
Notice of Allowance for U.S. Appl. No. 12/516,493, mailed on Jan. 20, 2012.
Notice of Allowance for U.S. Appl. No. 12/521,244, mailed on Jan. 26, 2012.
Restriction Requirement for U.S. Appl. No. 12/516,705, mailed on Dec. 12, 2011.
Tetsuo Nozawa, "Hitachi Achieves 0.05-mm Square Super Micro RFID Tag, 'Further Size Reductions in Mind'," Tech-On Nikkei Business Publications, Feb. 20, 2007, http://techon.nikkeibp.com.jp/english/NEWS_EN/20070220/127959/, 2 pp.
Tim Hornyak, "RFID Powder," Scientific American, Inc., Feb. 2008, pp. 68-71.
W Choi et al., "RFID Tag Antenna with a Meandered Dipole and Inductively Coupled Feed," IEEE Antennas and Propagation Society International Symposium 2006, vol. 9, Issue 14, Jul. 2006, pp. 619-622.
Winston Chai, "Euro notes to get RFID tags from Hitachi?," CBS Interactive Limited, May 23, 2003, http://networks.silicon.com/mobile/0,39024665,10004316,00.htm, 8 pp.
Notice of Allowance for U.S. Appl. No. 12/521,244, mailed on Mar. 29, 2012.
Final Office Action issued for U.S. Appl. No. 12/516,497, mailed on Jun. 5, 2012.
Non-Final Office Action issued for U.S. Appl. No. 12/516,500, mailed on Jun. 14, 2012.
Final Office Action for U.S. Appl. No. 12/516,648, mailed on Nov. 26, 2013, 16 pp.
Notice of Allowance issued for U.S. Appl. No. 12/516,715, mailed on Dec. 16, 2013, 7 pp.

* cited by examiner

FIG. 12
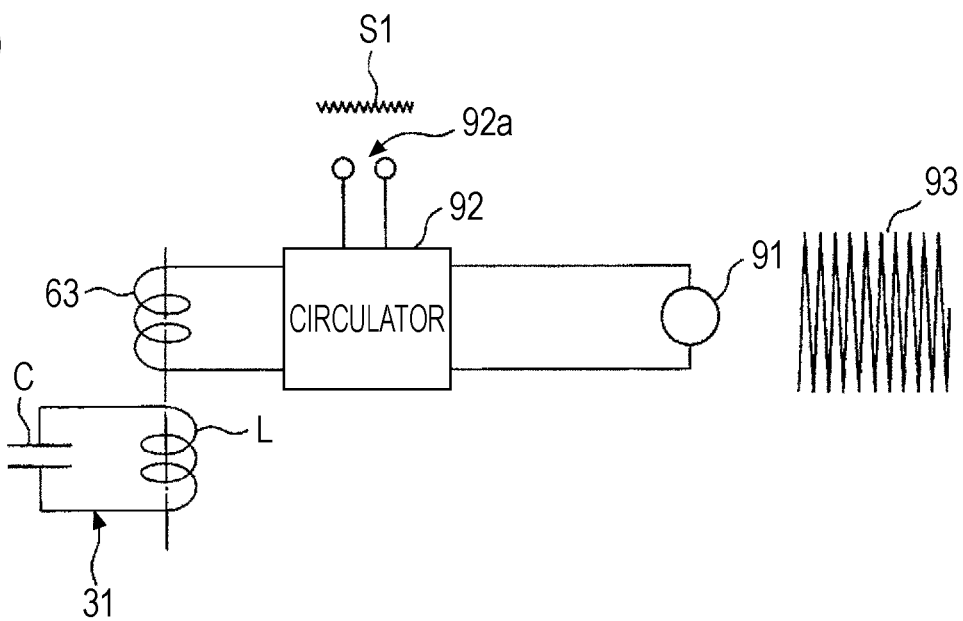
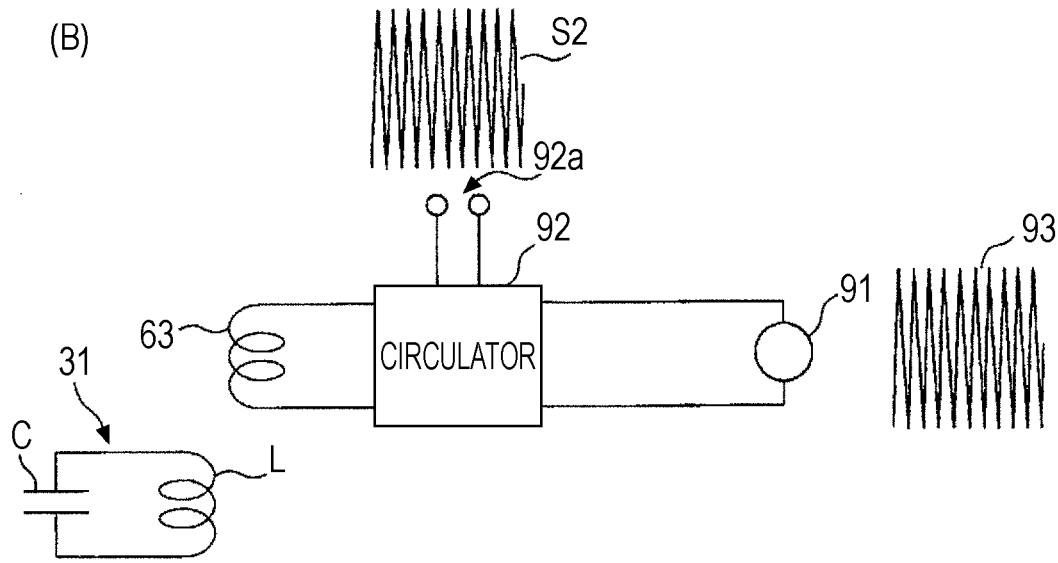

RF POWDER PARTICLE, RF POWDER, AND RF POWDER-CONTAINING BASE

CROSS-REFERENCE TO RELATED APPLICATIONS

The present application is a U.S. national stage application claiming the benefit of International Application No. PCT/JP2007/072750, filed on Nov. 26, 2007, which claims the benefit of Japanese Application No. 2006-320337, filed on Nov. 28, 2006, the entire contents of which are incorporated herein by reference in their entireties.

TECHNICAL FIELD

The present invention relates to an RF powder particle, an RF powder, and an RF powder-containing base. The RF powder particles can be used in a powdery state and be contained in, for example, paper, which allows information to be read out with an external high-frequency electromagnetic field (radio frequency).

BACKGROUND ART

Currently, it is believed that IC tags are products in the entrance to ubiquitous era. The IC tags have been developed as RF-IDs (ultra-compact radio frequency identifications) in, for example, name tags, Suica cards, and FeRAM cards. Many people expect that the IC tag market will certainly grow in the future. However, the market has not been expanded as expected. This is caused by problems that should be socially solved, such as cost, security, and confidentiality.

The RF-ID technologies may also be applied for identifying documents having proprietary values, such as bank notes and securities. It may be possible to solve the problems such as forged bank notes by embedding IC tags in bank notes or the like. However, it has not been realized yet because the IC tag is expensive and has a large size.

The price of the IC tag can be decreased by reducing the size of its IC tag chip. This is because that a reduction in size of the IC tag chip allows producing a large number of IC tag chips from one wafer. An IC tag chip with a size of 0.4 mm square has been developed at the present time. This IC tag chip allows reading out 128-bit memory data in the chip with a microwave of 2.45 GHz (for example, see Non-Patent Document 1).

Separately, a radio frequency automatic identification (RF/AID) system that uses an element other than IC tags and can be applied to, for example, identification of bank notes and credit cards has been also investigated. As an example of such a system, in Patent Document 1, a plurality of resonators that resonates with a plurality of radio frequencies is fixed on a substrate of paper or plastic such that they occupy random spatial positions on the substrate. The plurality of resonators is a passive solid resonator. The passive solid resonator includes a thin dipole made of an extended metal. More specifically, the passive solid resonator is made of a material belonging to a quartz family, such as quartz crystal. In a radio frequency target, a plurality of resonators disposed on a substrate resonate when they are each irradiated with an electromagnetic wave of radio frequency, and the alignment of the plurality of resonators is comprehended and identified by detecting the resonance.

[Patent Document 1] Japanese Unexamined Patent Application Publication No. 10-171951

[Non-Patent Document 1] Mitsuo USAMI, "An ultra small radio IC tag chip: µ-chip", OYO BUTURI (Applied Physics), Vol. 73, No. 9, 2004, pp. 1179-1183.

DISCLOSURE OF INVENTION

Problems to be Solved by the Invention

In various conventional cards including IC tags, one IC tag is used for one card. However, for example, if only one IC tag is used for a bank note, the configuration is simple, and, therefore, forged bank notes may be readily fabricated. If a bank note includes a plurality of resonators as in Patent Document 1, identification is carried out by differences in the alignment of the plurality of resonators and in the resonant frequency of the plurality of resonators, and, therefore, it may be difficult to fabricate forged bank notes. However, though the resonant frequency of each resonator can be changed, a resonator having a resonant frequency itself cannot store information such as identification number. Since a quartz resonator varies its resonant frequency depending on the size, a quartz resonator hardly generates different frequencies without changing the size. In addition, since the resonator is a passive solid resonator, includes a thin dipolar, and is made of a material belonging to a quartz family, the production of the resonator requires a specialized technique.

In consideration of the above-mentioned problems, it is an object of the present invention to provide an RF powder particle, an RF powder, and an RF powder-containing base that can make it difficult, with respect to plate- or sheet-like objects having high proprietary values, such as various kinds of cards, bank notes, and securities, to fabricate forged cards and documents and forged bank notes and that is provided with a tank circuit having a resonant frequency that can be freely designed.

Means for Solving the Problems

The RF powder particle, RF powder, and RF powder-containing base according to the present invention are configured as described below in order to achieve the above object.

The RF powder particle according to the present invention includes an inductance element as a magnetic field-coupling element and capacitance elements connected to the both ends, respectively, of the inductance element disposed on an insulating surface of a substrate such that a tank circuit is formed by the inductance element and the capacitance elements.

In the above configuration, the inductance element is formed by a coil disposed on the insulating surface. The capacitance elements are connected to and between the inner circumference side end and the outer circumference side end of the coil and are each composed of two electrodes opposing to each other on the insulating surface.

In the above configuration, an insulating film is disposed between the opposing two electrodes. This insulating film insulates between the coil and the electrodes of the capacitance elements and defines the capacitance.

In the above configuration, in the opposing two electrodes of the capacitance element, the electrode connected to the end of the coil is preferably disposed on the upper face of the insulating film, and the other electrode is preferably disposed on the lower face of the insulating film.

In the above configuration, in the opposing two electrodes of the capacitance element, the electrode connected to the end of the coil is preferably disposed on the lower face of the insulating film, and the other electrode is preferably disposed on the upper face of the insulating film.

In the above configuration, the substrate is preferably a semiconductor substrate having a surface provided with an insulating layer or a glass substrate.

The RF powder according to the present invention is used in a powdery state. Each particle of the powder includes an inductance element that serves as a magnetic field-coupling element and capacitance elements that are connected to the both ends of the inductance element and form a tank circuit on a substrate.

In the above configuration, it is preferable that the tank circuit formed and designed by the inductance element and the capacitance elements is characterized by responding to a designed high-frequency magnetic field that is given from outside.

The RF powder-containing base according to the present invention contains an RF powder of which particles each includes an inductance element that serves as a magnetic field-coupling element and capacitance elements that are connected to the both ends of the inductance element and form a tank circuit on a substrate. The each particles of the RF powder contained in the base is characterized by responding to the plurality of magnetic fields having differently designed frequencies.

In the above configuration, the base is preferably made of paper or plastic or is a bank note.

Advantages

In the RF powder particle and the RF powder according to the present invention, a single tank circuit is formed by the inductance element and the capacitance elements on an insulating surface of a substrate. Therefore, information can be simply and reliably transmitted to or received from between the RF powder particles using the resonant circuit mode or the non-resonant circuit mode of the single tank circuit with a high-frequency magnetic field given from outside. Furthermore, information relating to a single RF powder particle including the substrate can be read out by suitably combining the resonant circuit mode and the non-resonant circuit mode of its single tank circuit.

In the RF powder-containing base according to the present invention, the base made of paper or plastic includes a plurality of RF powders that are sensitive to electromagnetic fields having different frequencies. Therefore, the alignment of the plurality of RF powders and the electromagnetic fields having different frequencies of the plurality of RF powders can be identified. Consequently, if the invention is applied to bank notes where the base is paper, forged bank notes cannot be easily fabricated. In addition, the base can have necessary information by aligning a plurality of RF powders in the base and adjusting the alignment, the frequency, and the information.

Best Modes For Carrying Out The Invention

The preferred embodiments (examples) of the present invention will now be described with reference to the attached drawings.

FIG. 1 is a perspective cross-sectional view illustrating an RF powder-containing base according to an embodiment of the present invention. The RF powder-containing base is a base containing RF powders.

FIG. 1 illustrates a sheet-like or flexible plate-like base 10, such as paper, containing, for example, three different RF powder particles 11, 12, and 13 in an enlarged scale. The RF powder particles 11, 12, and 13 each characteristically respond to the respective electromagnetic fields having different high frequencies. In FIG. 1, the RF powder particles 11, 12, and 13 are drawn so as to have slightly different sizes for easy understanding of the RF powder particles 11, 12, and 13 each responding to the respective electromagnetic fields having different frequencies, but, actually, the RF powder particles 11, 12, and 13 have approximately the same size.

Actually, each kind of the RF powder particles 11, 12, and 13 described above is collectively handled in a powdery state composed of a large number or amount of RF powder particles, which configures an RF powder. In FIG. 1, the total number of the RF powder particles 11, 12, and 13 is 13, but the number of the RF powder particles is not limited thereto. The actual RF powder particles 11, 12, and 13 are in a powdery state and, therefore, are dispersed in the entire sheet-like base 10. The base 10 containing a large amount of the RF powder on the surface or inside thereof, as described above, is referred to as "RF powder-containing base 10".

The "RF powder" means a large amount of particles that form a powder (powdery substance or granular substance) and each include an electric circuit element conducting transmission and reception of a signal with an external reader via an electromagnetic field coupling through a radio frequency (high-frequency electromagnetic field: RF) and that are usually used collectively in a powdery state.

Next, a first embodiment of an RF powder particle forming an RF powder will be described with reference to FIGS. 2 to 5.

FIG. 2 is an external perspective view of an RF powder particle. FIG. 3 is a plan view of the RF powder particle. FIG. 4 is a cross-sectional view taken along the A-A line of FIG. 3. FIG. 5 is a cross-sectional view taken along the B-B line of FIG. 3. In the longitudinal cross-sectional views of FIGS. 4 and 5, the thickness of the RF powder particle is shown in an enlarged scale.

The RF powder particle 21 preferably has a cubic or plate-like rectangular parallelepiped three-dimensional shape where the external rectangular surface including the maximum side is preferably 0.30 mm square or less and more preferably 0.15 mm square or less. As shown in FIG. 3, the RF powder particle 21 in this embodiment has square planar surfaces each having a side length L of 0.15 mm (150 μm).

In the RF powder particle 21, an insulating layer 23 (for example, $SiO_2$) is formed on a substrate 22 made of, for example, silicon (Si), and a multi-wound coil 24 (inductance elements) and a condenser (or capacitor) 25 (capacitance element) are formed on the insulating layer 23 by a film-forming technique. The thickness of the insulating layer 23 is, for example, about 10 μm. The condenser 25 includes two elements 25a and 25b.

When the coil 24 and condenser 25 formed on the insulating layer 23 are coupled to a high-frequency magnetic field with a specific frequency (for example, 2.45 GHz), a resonant current flows circularly between the two devices. This is expressed as "response". As shown in FIG. 2 or 3, the coil 24 is formed by, for example, coiling a conductive wiring line three times along the sides of a planar square of the RF powder particle 21. The conductive wiring line forming the coil 24 is made of, for example, copper (Cu). The both ends of the coil 24 are formed into square pads 24a and 24b each having a desired area. One of the pads 24a and 24b is disposed at the inner circumference side of the coil 24, and the other is disposed at the outer circumference side. The two pads 24a and 24b are disposed such that the line connecting the both is orthogonal to the coil 24 crossing between the pads. The pads 24a and 24b function as upper electrodes of the two elements 25a and 25b of the condenser 25, respectively.

In the above, the number of the winding turns and the length of the coil 24 may be properly designed. In addition, the shape of the coil 24 may be properly designed.

The condenser 25 in this embodiment includes, for example, two condenser elements 25a and 25b. The condenser element 25a includes an upper electrode 24a, a lower electrode 26a (for example, aluminum (Al)), and an insulating film 27 (for example, $SiO_2$) disposed therebetween. The lower electrode 26a and the upper electrode 24a have approximately the same shapes and are electrically insulated from each other with the insulating film 27. The condenser element 25b includes an upper electrode 24b, a lower electrode 26b, and an insulating film 27 therebetween. Similar to the above, the lower electrode 26b and the upper electrode 24b have approximately the same shapes and are electrically insulated from each other with the insulating film 27.

The lower electrode 26a of the condenser element 25a and the lower electrode 26b of the condenser element 25b are connected to each other with a conductive wiring line 26c. Practically, the lower electrodes 26a and 26b and the conductive wiring line 26c are integrally formed. A single insulating film serves as the insulating film 27 of the condenser element 25a and the insulating film 27 of the condenser 25b. The insulating film 27 has a thickness of, for example, 30 nm and electrically insulates the conductive wiring line 26c connecting the lower electrodes 26a and 26b from the coil 24 in the region between the two condenser elements 25a and 25b.

In the above configuration, the condenser 25 composed of the two condenser elements 25a and 25b that are electrically connected in series is connected to and between the both ends of the coil 24 so as to form a loop, which forms a tank circuit (LC resonant circuit). The tank circuit responds to a high-frequency electromagnetic field having a frequency that is coincident to the resonant frequency.

As obvious from FIGS. 4 and 5, the entire surface of the RF powder particle 21 is coated with a P-SiN film 28. The P-SiN film 28 protects the surface, where the tank circuit is formed, of the RF powder particle 21.

In the above, the condenser 25 includes two condenser elements 25a and 25b, but is not limited thereto and may be formed of any one of the condenser elements. The capacitance value of the condenser 25 can be properly changed by controlling the area of the electrode. Furthermore, a plurality of condensers may be disposed in parallel.

Since the RF powder particle 21 having the above-mentioned configuration includes a tank circuit composed of a multi-wound coil 24 and a condenser 25 that are connected to each other so as to form a loop on the insulating surface of the substrate 22, the RF powder particle 21 has a function of responding to a high-frequency magnetic field that is defined by the resonant frequency of the tank circuit. Accordingly, the RF powder particle 21 functions as an "RF powder particle" that resonates with a designed frequency.

The coil 24 and the condenser 25 disposed on the insulating layer 23 are not electrically connected to the surface of the substrate 22. That is, the insulating layer 23 deposited on the substrate 22 is not provided with contact holes, and thereby contact wiring is not formed. The tank circuit composed of the coil 24 and the condenser 25 is electrically insulated from the silicon substrate 22 and is configured to form a resonant circuit by itself in a state separated from the substrate 22.

In the RF powder particle 21 described above, the substrate 22 serving as a foundation is a silicon substrate and has an insulating layer 23 on the surface. The substrate may be made of a dielectric (insulator) such as glass, a resin, or plastic, instead of the silicon substrate. When a substrate made of an insulator (dielectric), such as a glass substrate, is used, the insulating layer 23 is not necessary.

FIG. 6 is an equivalent circuit view illustrating a characteristic structure of the tank circuit (LC resonant circuit) disposed on the substrate 22. The tank circuit 31 is formed on the insulating layer 23 of the substrate 22. The tank circuit 31 is composed of an inductance element (L) and a capacitance element (C). The inductance element L is formed of the coil 24 described above. The capacitance element C is formed of the condenser 25 described above and is composed of two condenser elements 25a and 25b.

Next, an RF powder particle for forming an RF powder according to a second embodiment will be described with reference to FIGS. 7 and 8. FIG. 7 is a plan view illustrating the RF powder particle according to the second embodiment, and FIG. 8 is a cross-sectional view taken along the C-C line of FIG. 7. FIG. 7 corresponds to FIG. 3, and FIG. 8 corresponds to FIG. 4. In FIGS. 7 and 8, substantially the same components as those described in FIGS. 3 and 4 are designated by the same reference numerals.

The pattern of a coil 24 is formed on the upper face of an insulating layer 23 of the RF powder particle 21 at an inner side of an insulating layer 35. The coil 24 is substantially threefold coiled and has a patterned shape that is different from that of the coil shown in FIG. 3, but the function and other characteristics are substantially the same as those of the coil shown in FIG. 3. At the inner periphery side end and the outer periphery side end of the coil 24, lower electrodes 24c and 24d are disposed, respectively. Furthermore, an insulating layer (for example, $SiO_2$ or SiN) 36 is disposed on the insulating layer 35, the coil 24, and the two lower electrodes 24c and 24d. Furthermore, a conductive metal layer 37 having upper electrodes 37a and 37b corresponding to the two lower electrodes 24c and 24d, respectively, is disposed on the insulating layer 36. At the inner periphery side end of the coil 24, the lower electrode 24c and the upper electrode 37a are disposed so as to oppose with the insulating layer 36 therebetween to form the condenser element 25a. At the outer periphery side end of the coil 24, the lower electrode 24d and the upper electrode 37b are disposed so as to oppose with the insulating layer 36 therebetween to form the condenser element 25b. The condenser element 25a and the condenser element 25b form the condenser 25.

In the RF powder particle 21 according to the second embodiment, the coil 24 is disposed below the insulating layer 36 that is disposed between the lower electrodes 24c and 24d and the upper electrodes 37a and 37b of the condenser 25 (condenser elements 225a and 25b). The electrodes 24c and 24d disposed at both ends of the coil 24 serve as the lower electrodes of the condenser elements 25a and 25b. The upper electrodes 37a and 37b of the condenser element 25a and 25b are disposed on the insulating layer 36. The configuration of the RF powder particle 21 according to the second embodiment has advantages that the tank circuit 31 composed of the coil 24 and the condenser 25 can be readily produced and that the insulating layer 23 of the substrate 22 can have a planar shape.

Next, a method for inspection of the RF powder-containing base (base 10) containing the RF powder particles (11 to 13) having the above-described configuration and the process of the inspection will be described with reference to FIGS. 9 to 11.

FIG. 9 shows a configuration of an inspection apparatus. As described in FIG. 1, a sheet-like base 10, such as bank notes, contains a considerable number of RF powder particles (11, 12, and 13). FIG. 9 shows the thickness of the base 10 in an enlarged scale.

The base 10 is scanned with a reader 62 that is connected to a computer 61. The computer 61 loads frequency-depending data as the response of a plurality of RF powder particles 11. The computer 61 includes a body 61*b* processing data, a display 61*a*, and a keyboard 61*c* for carrying out operation.

The reader 62 has a reading probe 63 (see FIG. 10). The reading probe 63 generates a high-frequency electromagnetic field in the vicinity thereof and is coupled to the powder (RF powder particles 11 to 13) by magnetic field coupling. When the powder particle has a unique frequency of, for example, 2.45 GHz, a high-frequency electromagnetic field having a frequency of 2.45 GHz causes resonance to transmit the electromagnetic field energy to the RF powder particle. In order to efficiently transmit the electromagnetic field energy, it is necessary that the reading probe generates the electromagnetic field in the vicinity of the RF powder particle so that the coil of the RF powder particle is sufficiently coupled to the electromagnetic field. It is desirable for efficient coupling in space that their coils are approximately the same in size and that the distance between the coils is approximately the same as the sizes of the coils. If there is a loss in energy, that is, the energy transmitted to a circuit does not return, the reflection coefficient is reduced. Accordingly, the resonance can be confirmed by, for example, measuring the reflection coefficient.

A unique resonant frequency of 2.45 GHz of the RF powder particle is detected by varying the frequency of the reading probe 33, for example, from 1 to 3 GHz. The position of the powder is determined by scanning the surface of the base 10 with the reader 32 while maintaining a constant distance between the reader and the surface for causing magnetic field coupling.

The reader 62 and the reading probe 63 shown in FIGS. 9 to 11 are conceptually drawn and are not shown as practical structures.

FIG. 10 schematically shows a process when the reading probe 63 of the reader 62 generates a certain high frequency, a resonant current flows in the coil of the tank circuit of a RF powder particle 11 having a unique resonant frequency that is identical or similar to the certain high frequency, and an electromagnetic field H is generated around the RF powder particle 11. This is occasionally expressed as "responding" in the description of this embodiment. Since the RF powder particle is sufficiently small in size (0.15 mm) compared to the wavelength (for example, 15 cm in 2 GHz band), the radiated components of electromagnetic waves can be ignored. The transmission, reflection, and loss of high-frequency energy from the reading probe are carried out through magnetic field coupling.

FIG. 11 shows a process of transmission and reflection of energy due to magnetic field coupling at a portion where the RF powder particle 11 lies. The reader 32 moves for scanning, and the reading probe 63 lies above the RF powder particle 11. The reading probe 63 generates a high-frequency magnetic field in the vicinities thereof while varying the frequency in a predetermined range. When the frequency is close or identical to the unique resonant frequency of the RF powder particle 11, currents flow in the tank circuit formed of the coil and the condenser of the RF powder particle at the same frequencies through the magnetic field coupling. As a result, transition of energy occurs (shown by the arrow 64 in FIG. 11). The currents generate magnetic fields in the vicinities thereof, and part of the transmitted (or "received") energy is consumed as heat in the circuit into an energy loss component. The loss component can be measured as a decrease in the reflection component (shown by the arrow 65 in FIG. 11) when observed from the reading probe side. When the frequency is identical to the characteristic frequency, the loss is the maximum, resulting in a decrease of the reflection component. By measuring this decrease, the reader 62 measures a resonant frequency as frequency information of the RF powder particle 11 and sends it to the computer 61 together with the positional information of the reading probe 63.

Similarly, the reader 62 moves for scanning and when the reading probe 63 is positioned above the RF powder particle 12 and generates a high-frequency electromagnetic field having a frequency which the RF powder particle 12 responds to, the RF powder particle 12 couples with the high-frequency magnetic field and resonates. Consequently, the frequency information of the RF powder particle 12 is similarly read out. Furthermore, the reader 62 moves for scanning and when the reading probe 63 is positioned above the RF powder particle 13 and generates a high-frequency electromagnetic field having a frequency which the RF powder particle 13 responds to, the RF powder particle 13 couples with the high-frequency magnetic field and resonates. Consequently, the frequency information of the RF powder particle 13 is read out.

A probe circuit that transmits and receives a high-frequency electromagnetic field for loading frequency information of an RF powder particle will now be described with reference to FIGS. 12 and 13.

The transmission/reception operation of electromagnetic response by the reading probe 63 through the tank circuit 31 provided to each RF powder particle will be described with reference to FIG. 12. FIG. 12(A) shows a state in that the tank circuit 31 resonates (resonance state) so that the reflection of a transmitting signal is small. FIG. 12(B) shows a state in that the tank circuit 31 does not resonate (non-resonance state) so that the reflection of a transmitting signal is large. These responses are in the case that the resonant frequency of the tank circuit 31 and the frequency of high-frequency electromagnetic field outputted from the reading probe 63 are the same.

The probe circuit supplying a high frequency to the reading probe 63 is composed of a high-frequency oscillator 91 and a circulator 92. The high-frequency oscillator 91 outputs a high frequency 93 for allowing the reading probe 63 to generate a high-frequency electromagnetic field E. The high frequency 93 is transmitted to the reading probe 63 via the circulator 92. The reading probe 63 generates a high-frequency electromagnetic field E based on the supplied high frequency 93. The circulator 92 is a circuit element for changing the current flow route with the electric power supplied from the high-frequency oscillator 91 and the reflection from the reading probe 63. The reflected power from the reading probe 63 is outputted to an output terminal 92*a*.

The tank circuit 31 of the RF powder particle reacts to the high-frequency electromagnetic field E generated by the reading probe 63 according to the resonance state or non-resonance state.

FIG. 12 shows a difference in response that occurs depending on the positional difference in the RF powder particle (tank circuit 31) and the reading probe 63 in the case that two RF powder particles including tank circuits 31 having the same resonant frequencies are present near each other. FIG. 12(A) shows an example where the tank circuit 31 of the RF powder particle lies at a place corresponding to the position of reading probe 63 and is in a resonance state. FIG. 12(B) is an example where the tank circuit 31 of the RF powder particle lies at a place apart from the position of the reading probe 63 and does not resonate because of insufficient coupling.

In the case shown in FIG. 12(B), since the tank circuit 31 lies at a place where it does not respond to the high-frequency electromagnetic field from the reading probe 63, the resonance state of the tank circuit 31 is not generated, and reflection without a loss occurs. Therefore, a high level reflection response S2 is outputted from the output terminal 92a of the circulator 92.

FIG. 13 shows another embodiment. In this embodiment, electromagnetic response between the tank circuit 31 of the RF powder particle and the reading probe 63 is carried out by self-oscillation using a gain feedback-filter.

In FIG. 13, the reference numeral 31 refers to the above-mentioned tank circuit provided to the RF powder particle. The probe circuit of the reading probe 63 includes a positive feedback amplifier 101. The positive feedback amplifier 101 includes a bleeder resistor 111 and feedback resistors 112 and 113. As a feedback load of the positive feedback amplifier 101, the probe coil 102 of the reading probe 63 and the tank circuit 31 of the RF powder particle in the electromagnetic coupling state are inserted as the circuit. As shown in FIG. 13, when the RF powder particle is close to the reading probe 63 of the reader 62, electromagnetic coupling 103 is generated, the feedback ratio in the positive feedback amplifier 101 exceeds a value of 1, and self-oscillation occurs. When the RF powder particle is apart from the reading probe 63 until the electromagnetic coupling 103 is decreased, the self-oscillation is terminated. In this case, the resistance losses of the coil of the tank circuit 31 and the probe coil 102 of the reading probe 63 are designed such that a sufficient feedback ratio is obtained.

When the degree of the electromagnetic coupling 103 between the tank circuit 31 and the probe coil 102 of the reading probe 63 is large, a detection signal 105 with a high level is outputted from the output terminal 104 of the positive feedback amplifier 101. When the degree of the electromagnetic coupling 103 is small, only a small seed high frequency 114, which depends on negative feedback resistor 113, is detected at the output terminal 104.

An advantage of the above-mentioned detection system is that since only a single resonant frequency is accurately selected, the measurement of a frequency allows measuring a difference in resonant frequency of RF powder particles with high accuracy and differentiating the RF powder particles. In order to accelerate the resonant response, it is also preferable that the time swept seed excitation high frequency be superposed on the reading probe 63.

Another embodiment of an electric circuit relating to the reading probe 63 will be described with reference to FIGS. 14 and 15. In this embodiment, transmission and reception are temporally switched to conduct transmission and ringing reception.

In FIG. 14, a signal is transmitted or received based on electromagnetic coupling 103 instantly generated between the tank circuit 31 of an RF powder particle and the probe coil 102 of the reading probe 63. The probe circuit (read circuit 200) of the reading probe 63 is composed of an RF transmitter 201, a gate switch 202 for transmission, an RF receiver 203, a gate switch 204 for reception, and a transmission/reception indicator 205. The gate switches 202 and 204 are alternately switched ON and OFF based on an indication signal 206 of the transmission/reception indicator 205 provided that the RF transmitter 201 and the RF receiver 203 are in active states. In FIG. 14, the reference numeral 207 shows a pattern of the transmission and reception states in the read circuit 200 that are alternately generated on an time axis 208 by alternately switching ON and OFF the gate switches 202 and 204 based on the indication signal 206 of the transmission/reception indicator 205.

The shape of the transmission wave in the transmission state and the shape of the reception wave in the reception state are shown in FIG. 15 and are indicated by reference numerals 211 and 212, respectively.

When the gate switch 202 is ON and the gate switch 204 is OFF, a high frequency is supplied from the RF transmitter 201 to the tank circuit 31 via the probe coil 102. If the frequency corresponds to that of the tank circuit 31, an electric current of the same frequency flows. An electromagnetic field of the same frequency is generated around the coil (L) of the tank circuit 31, and a voltage is induced in the probe coil 102 by the electromagnetic field.

Then, the gate switch 202 is turned to OFF. Consequently, damped oscillation of the current in the tank circuit 31 occurs because of the termination of supply of the excited electromagnetic field from the reading probe 63. In addition, damped oscillation of the electromagnetic field around the tank circuit 31 occurs. In this state, the RF receiver 203 receives the damped oscillation 212 through the probe coil 102 by turning the gate switch 204 to ON. The RF receiver 203 is set so as to receive a component with the same frequency as that used for excitation. When a reception signal is detected by scanning a portion where an RF powder is present with the reading probe 63, the presence of the RF powder particle having the resonant frequency is given as information. The retention time of the damped oscillation 212 depends on the Q value representing a loss in coil, but it is Q times the oscillation frequency at the highest.

A third embodiment of the RF powder particle will be described with reference to FIGS. 16 to 19. The RF powder particle 301 is a modification example of the first embodiment. FIG. 16 shows a longitudinal cross-sectional view of a main portion of the RF powder particle, as in FIG. 4. FIG. 17 is a plan view of the RF powder particle. FIGS. 18 and 19 are enlarged longitudinal cross-sectional views showing another example of the electrode portion of a condenser element. In FIGS. 16 to 19, substantially the same components as those described in the first embodiment are designated by the same reference numerals.

As shown in FIG. 16, in the RF powder particle 301 having a tank circuit, an insulating layer 23 having a thickness of 10 μm is disposed on a substrate 22, and an etching stopper film 302 is disposed on the insulating layer 23. The etching stopper film 302 is preferably made of P-SiN. Furthermore, an oxide film 303 provided with cavities at predetermined regions is disposed on the etching stopper film 302. The cavity-forming regions of the oxide film 303 are formed by etching, and the etching stopper film 302 controls the etching process and prevents the insulating layer 23 from being etched. The predetermined regions for forming the cavities of the oxide film 303 serve as regions for forming the condenser elements 25a and 25b of the condenser 25.

Lower electrodes 304a and 304b are disposed on a region containing the cavity-forming regions of the oxide film 303. The lower electrodes 304a and 304b have shapes having cavities along the cavities of the oxide film 303. Furthermore, an insulating layer (dielectric) 305 is disposed on the lower electrodes 304a and 304b, and upper electrodes 306a and 306b made of, for example, copper (Cu) are disposed on the insulating layer 305 so as to oppose the lower electrodes 304a and 304b having the cavities, respectively. The upper electrodes 306a and 306b shown in FIGS. 16 and 17 have planar upper faces, but the faces opposing to the lower electrodes 304a and 304b having the cavities are shaped so as to have projections corresponding to the cavities of the lower electrodes.

One of the two upper electrodes 306a and 306b of the respective condenser elements 25a and 25b is disposed at the inner periphery side end of the spiral coil 24, and the other is disposed at the outer periphery side end of the coil 24, as described above. The entire coil 24 is disposed on the oxide film 303 except that a portion crossing a conductive wiring line 304c connecting the two lower electrodes 304a and 304b is disposed on the insulating layer 305.

In the above-described RF powder particle 301, the inductance element of the coil 24 and the capacitance elements of the condenser 25 form the tank circuit (31). In this case, in the two condenser elements 25a and 25b forming the condenser 25, the upper electrodes 306a and 306b and the lower electrodes 304a and 304b form projection and cavity structures 307 on the opposing faces, which enlarges the area of the opposing faces having the insulating layer 305 therebetween. As a result, the resonant frequency of the tank circuit is decreased compared to that of another RF powder particle having the same size. In other words, the RF powder particle has an advantage that the size for achieving the same resonant frequency can be reduced.

FIG. 18 shows another modification example of the RF powder particle 301 and is an enlarged longitudinal cross-sectional view showing in detail, for example, a condenser element 25b. In FIG. 18, substantially the same components as those described in FIG. 16 are designated by the same reference numerals, and the descriptions thereof are omitted. In the example shown in FIG. 18, the number of the cavities of the projection and cavity structure 307 is increased.

The characteristic points of the condenser element 25b shown in FIG. 18 are that the upper face of the upper electrode 306b also has cavities and that the insulating layer (dielectric) 305A disposed between the lower electrode 304b and the upper electrode 306b is formed by oxidizing the lower electrode 304b. The configuration other than these points is the same as that shown in FIGS. 16 and 17.

In this embodiment, the lower electrode 304b is made of a metal such as Ti (titanium), Ta (tantalum), Zr (zirconium), Hf (hafnium), or Al (aluminum). In this case, the dielectric as the oxide produced by oxidizing the lower electrode 304b becomes an insulating layer 305A having a high dielectric constant.

Similarly, FIG. 19 shows another modification example of the RF powder particle 301 and is an enlarged longitudinal cross-sectional view for showing in detail a condenser element 25b. The characteristic points of the condenser element 25b shown in FIG. 19 are that the upper face of the upper electrode 306b also has cavities and that the insulating layer (dielectric) 305B disposed between the lower electrode 304b and the upper electrode 306b is formed by depositing a high dielectric constant material on the lower electrode 304b. The configuration other than these points is the same as that shown in FIGS. 16 and 18.

In this embodiment, the lower electrode 304b may be made of any metal. The high dielectric constant material deposited on the lower electrode 304b is, for example, BST or STO (SrTiO$_3$: dielectric constant of 110 to 200). With this, an insulating layer 305B having a high dielectric constant is formed between the lower electrode 304b and the upper electrode 306b.

A process for forming the projection and cavity structure in the upper and lower electrodes having the insulating layer (dielectric) therebetween in a condenser is disclosed in Japanese Patent Application No. 2004-071548 (filed on Mar. 12, 2004), which is the invention of the present inventors, as a practicable technology.

The configurations, shapes, sizes, and arrangements described in the above embodiments merely show the present invention schematically such that the invention can be understood and carried out. Accordingly, the present invention is not limited to the embodiments described above and can be variously modified within the scope of the technical concept described in the claims.

Industrial Applicability

The powder antenna circuit element and other elements according to the present invention can be used in, for example, bank notes, credit cards, and documents and can reliably prevent, for example, forged bank notes.

BRIEF DESCRIPTION OF DRAWINGS

FIG. 12 is diagrams illustrating the transmission/reception operation of a signal in a reading probe through a tank circuit provided to an RF powder particle.

Figure 1:
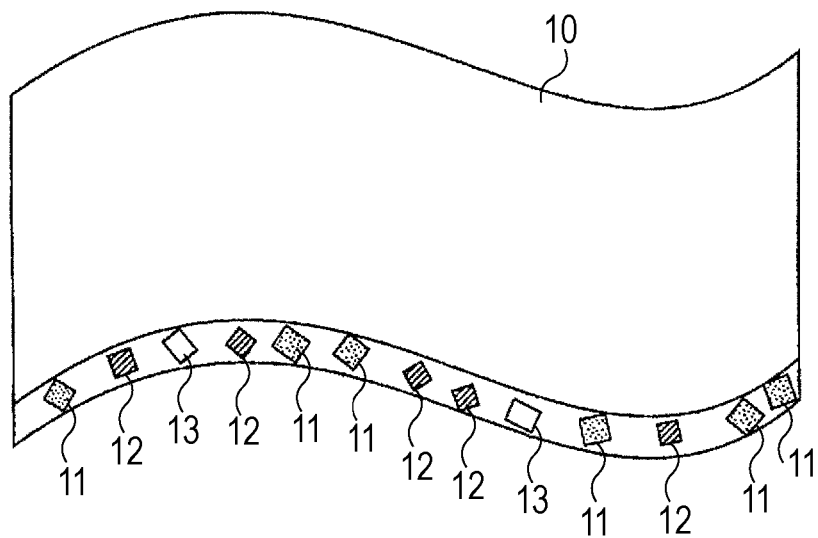
FIG. 1 is a perspective cross-sectional view of an RF powder-containing base according to an embodiment of the present invention.
Figure 2:
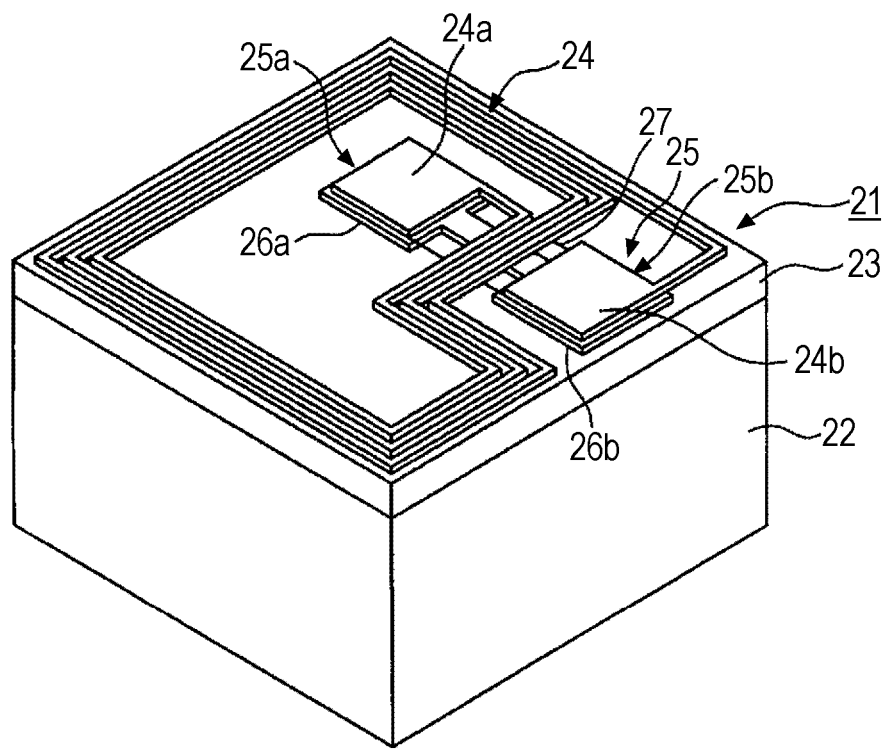
FIG. 2 is a perspective view of an RF powder particle contained in an RF powder-containing base of a first embodiment.
Figure 3:
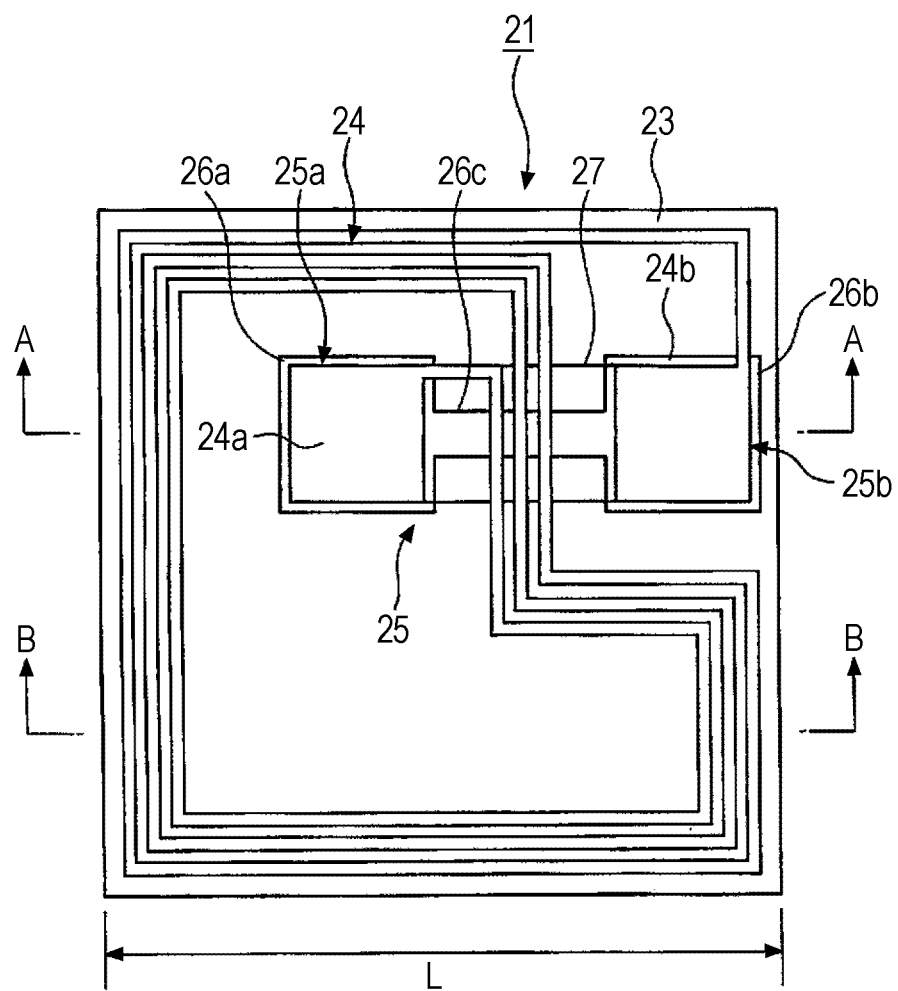
FIG. 3 is a plan view of the RF powder particle according to the first embodiment.
Figure 4:
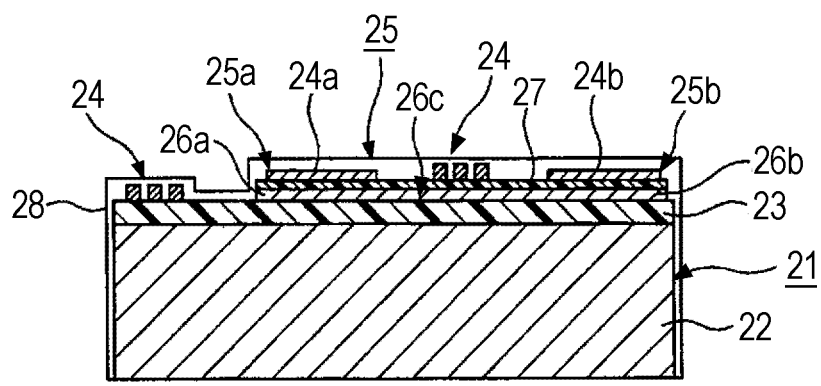
FIG. 4 is a cross-sectional view taken along the A-A line of FIG. 3.
Figure 5:
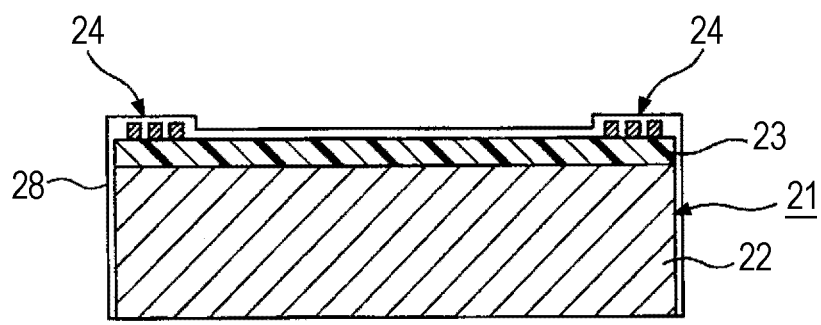
FIG. 5 is a cross-sectional view taken along the B-B line of FIG. 3.
Figure 6:
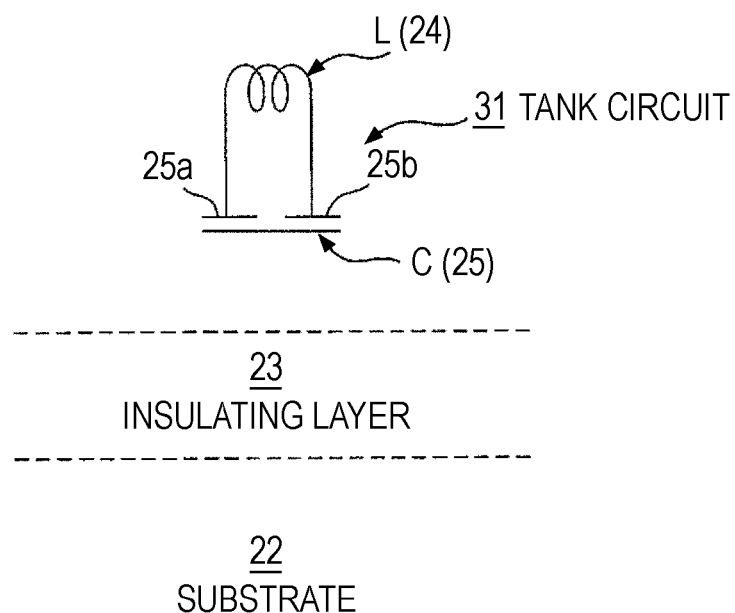
FIG. 6 is a schematic diagram illustrating an equivalent circuit of a tank circuit according to the embodiment.
Figure 7:
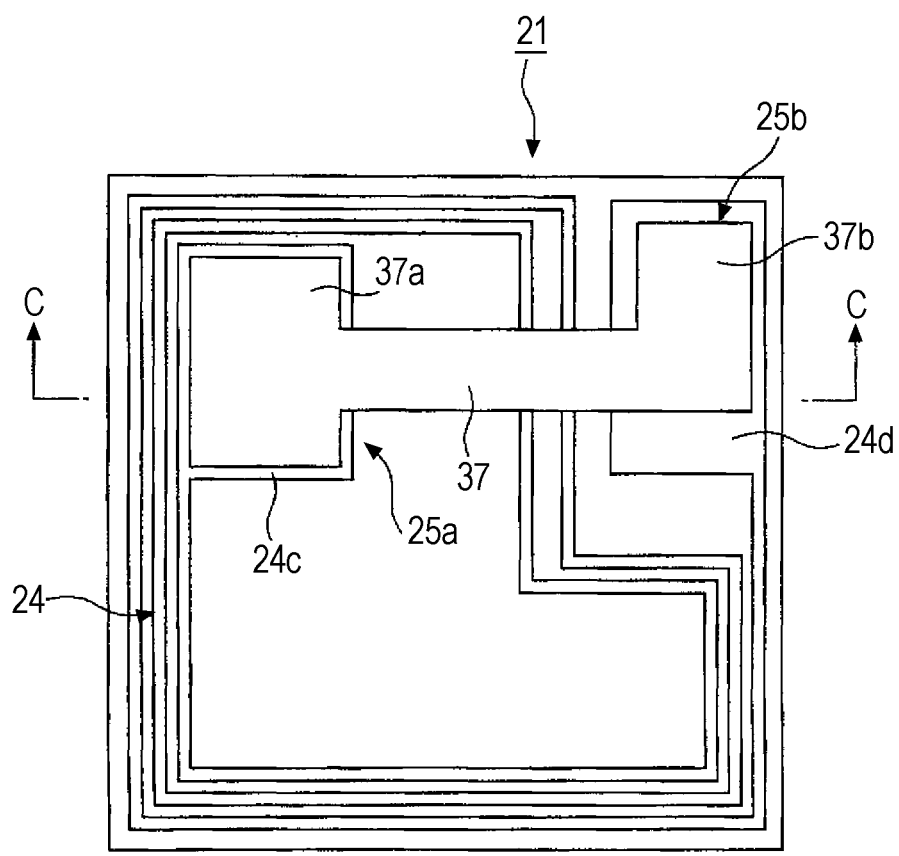
FIG. 7 is a plan view of an RF powder particle according to a second embodiment.
Figure 8:
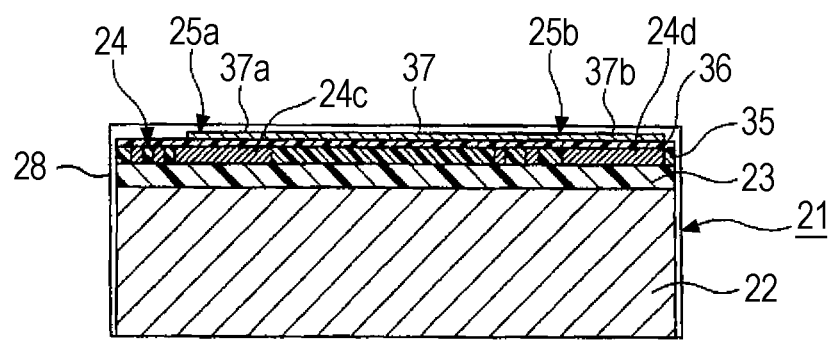
FIG. 8 is a cross-sectional view taken along the C-C line of FIG. 7.
Figure 9:
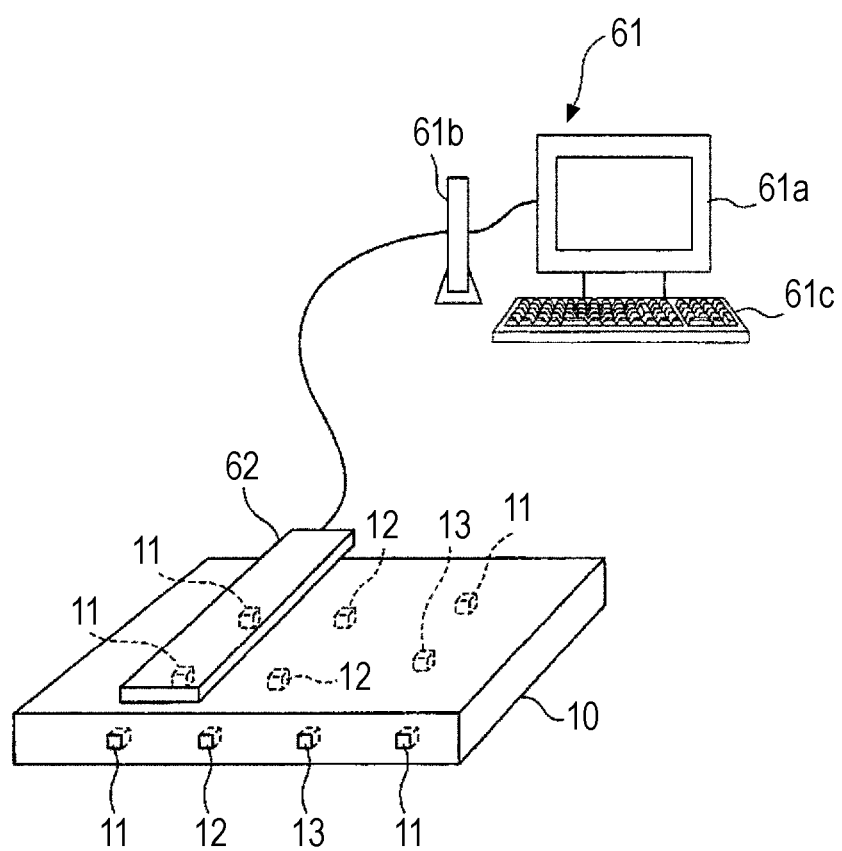
FIG. 9 is a diagram illustrating a configuration of an apparatus for inspecting an RF powder-containing base according to the embodiment.
Figure 10:
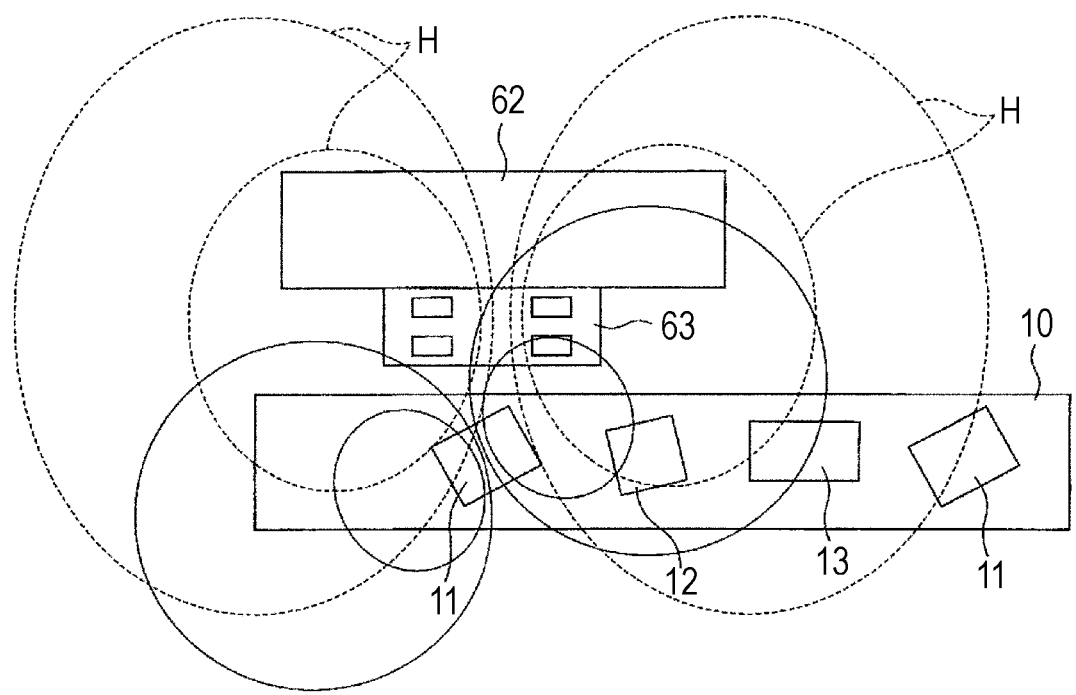
FIG. 10 is a side view illustrating a state receiving a signal when a reader inspects the RF powder-containing base.
Figure 11:
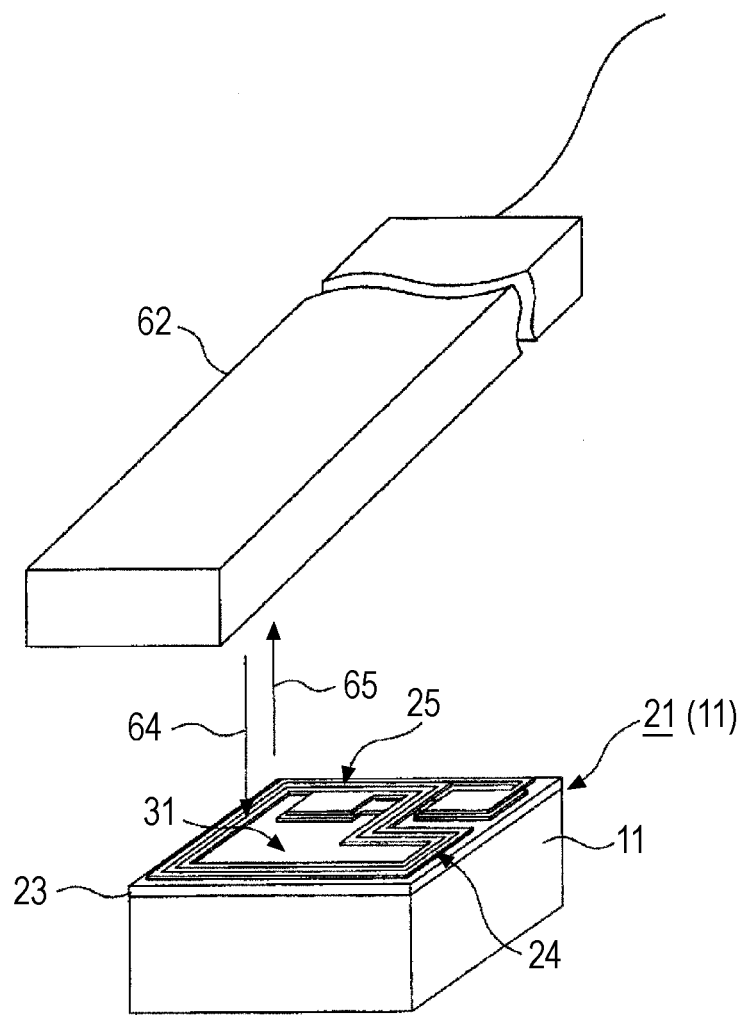
FIG. 11 is a diagram illustrating a relation of transmission and reception of a high-frequency electromagnetic field with a reader at a portion where one RF powder particle lies.
Figure 13:
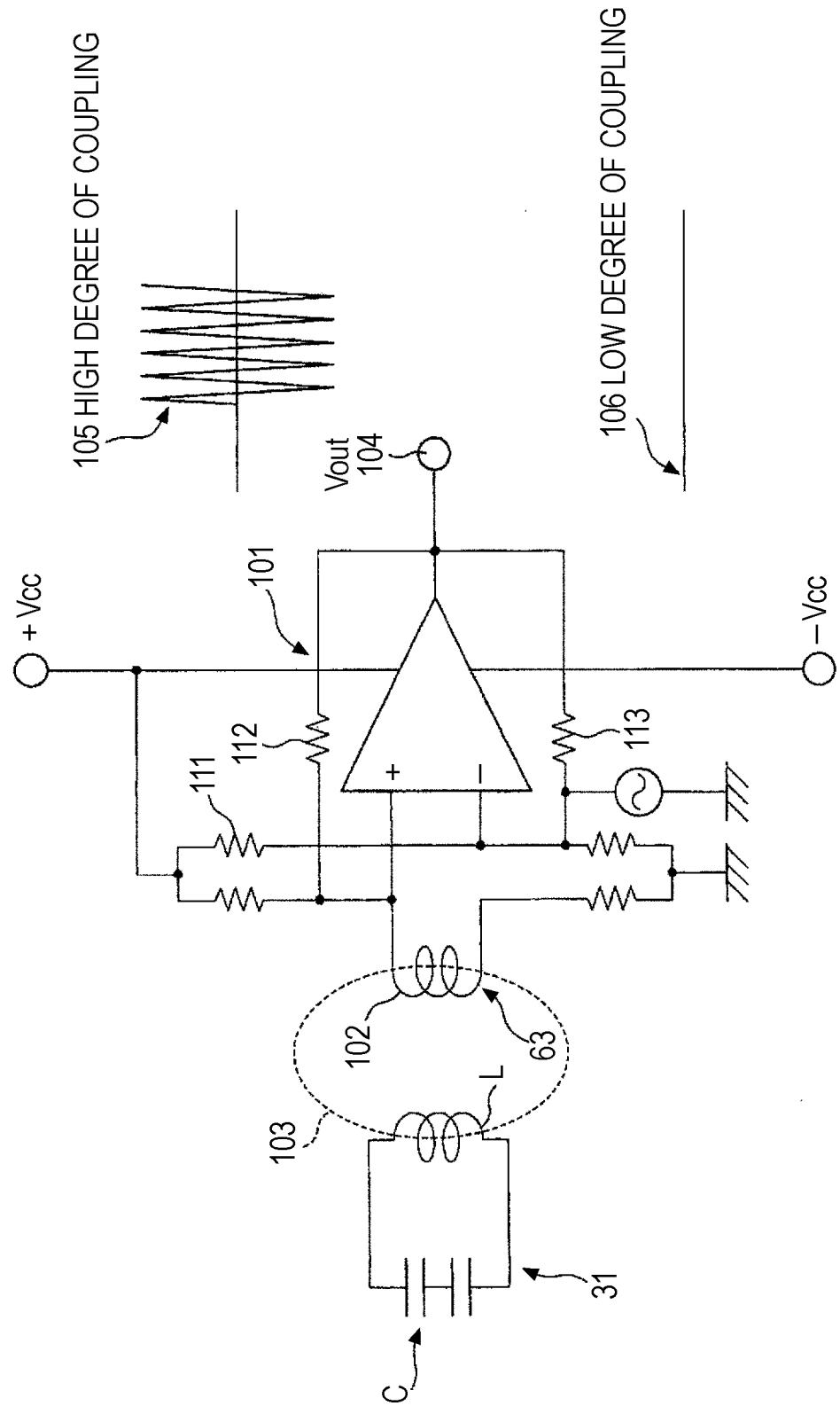
FIG. 13 is an electric circuit diagram illustrating another embodiment of the electric circuit of a reading probe.
Figure 14:
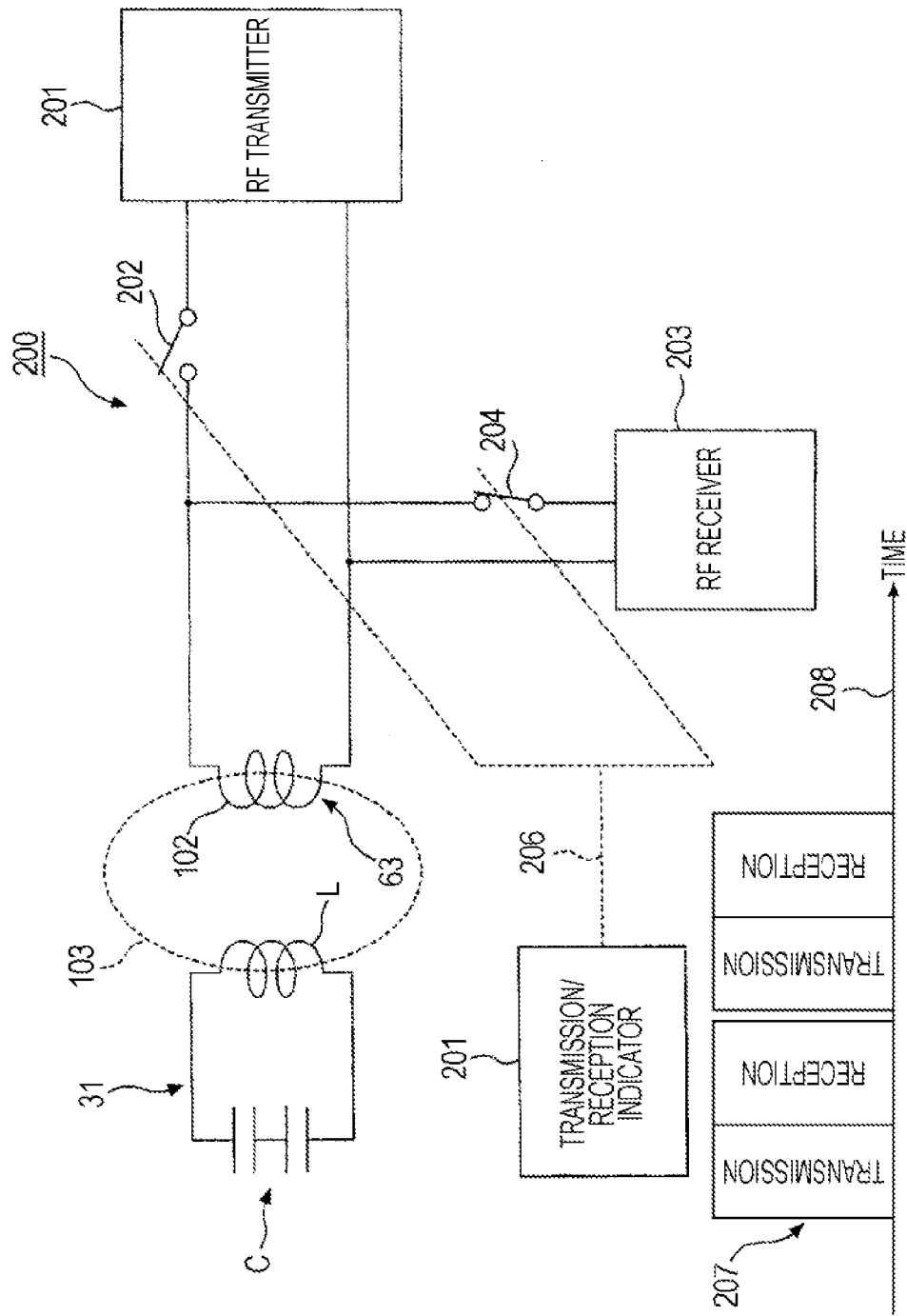
FIG. 14 is an electric circuit diagram illustrating another embodiment of the electric circuit of a reading probe.
Figure 15:
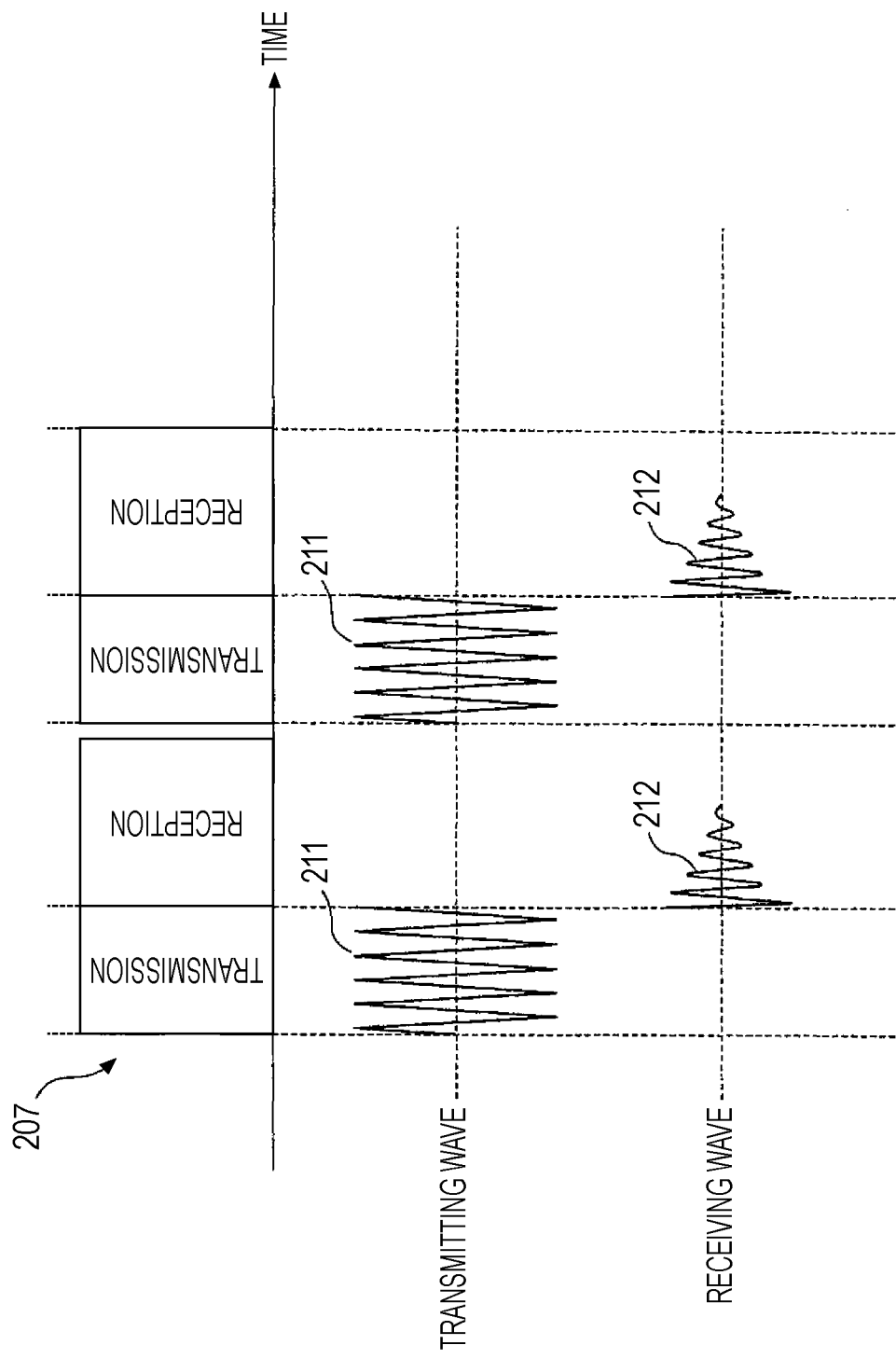
FIG. 15 is a timing chart illustrating a process for changing the transmission and the reception.
Figure 16:
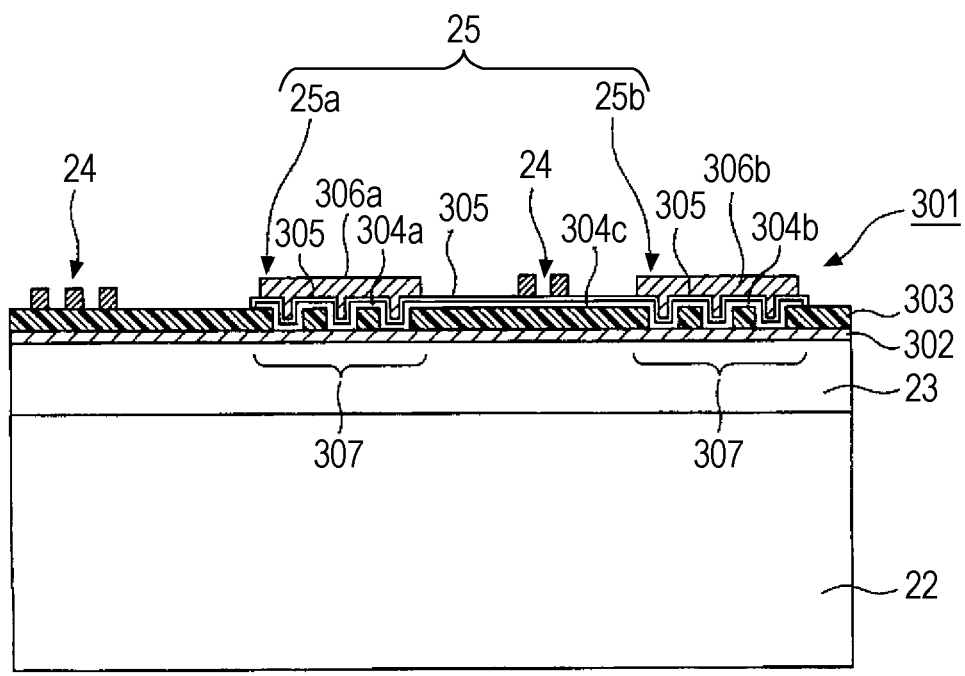
FIG. 16 is a longitudinal cross-sectional view, as in FIG. 4, of a main portion of an RF powder particle according to a third embodiment of the present invention.
Figure 17:
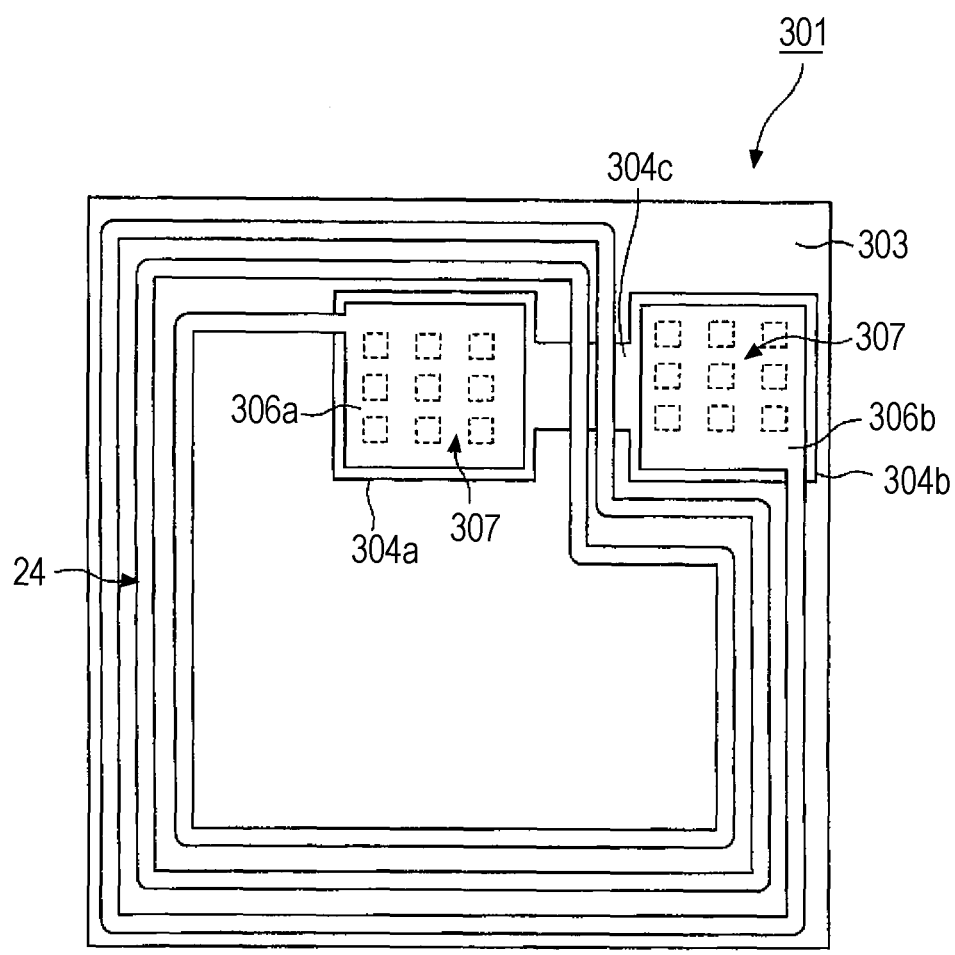
FIG. 17 is a plan view of the RF powder particle according to the third embodiment.
Figure 18:
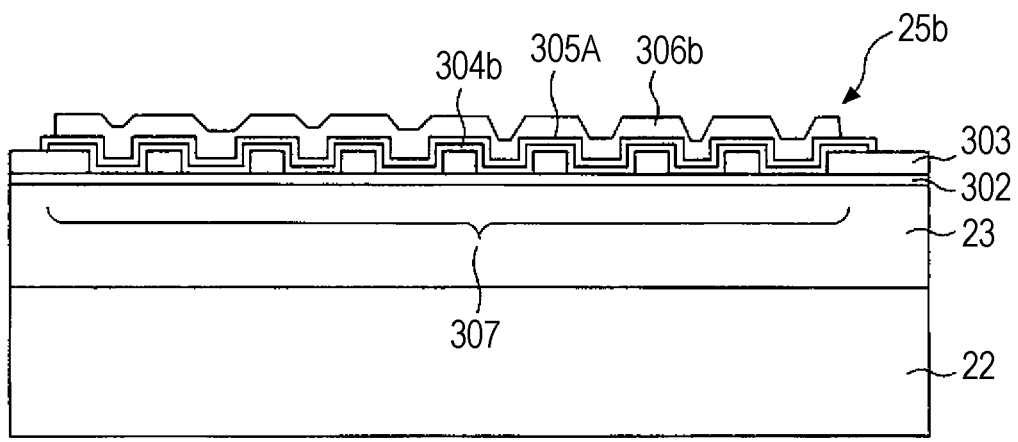
FIG. 18 is a partially enlarged longitudinal cross-sectional view of an electrode portion of a condenser element, for illustrating a modification example of the RF powder particle according to the third embodiment.
Figure 19:
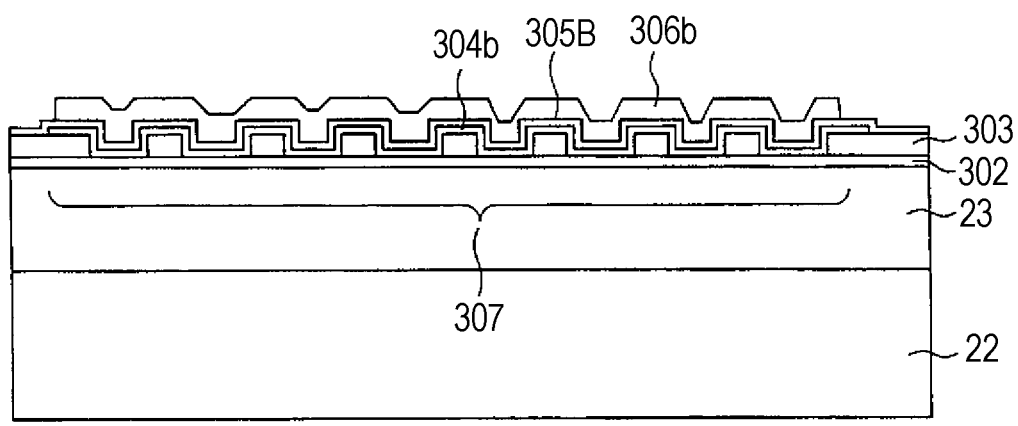
FIG. 19 is a partially enlarged longitudinal cross-sectional view of an electrode portion of a condenser element, for illustrating another modification example of the RF powder particle according to the third embodiment.

REFERENCE NUMERALS 10 substrate (for example, bank note)
11, 12, 13 RF powder particle
21 RF powder particle
22 substrate
23 insulating layer
24 coil
25 condenser (capacitor)
27 insulating film
31 tank circuit
62 reader
63 reading probe

The invention claimed is:

1. An RF powder particle comprising an inductance element serving as a magnetic field coupling element and a capacitance element connected to both ends of the inductance element on an insulating surface of a substrate, wherein the inductance element and the capacitance element form a tank circuit, wherein the RF particle is physically bounded by an external surface, and wherein the RF powder particle is sized and shaped such that the external surface has a surface area of at most 0.3 millimeters squared; and
    wherein an insulating layer is formed on a side of the inductance element, wherein the capacitance element comprises a first electrode, a dielectric film, and a second electrode, wherein the first electrode is disposed between the dielectric film and the insulating surface of the substrate, and wherein the dielectric film is disposed between the first electrode and the second electrode and over the insulating layer.

2. The RF powder particle according to claim 1, wherein the inductance element is formed by a coil disposed on the insulating surface, and the capacitance element is connected to and between the inner circumference side end and the outer circumference side end of the coil and is composed of two electrodes opposing to each other on the insulating surface.

3. The RF powder particle according to claim 2, wherein an insulating film is disposed between the two electrodes and insulates between the coil and the electrodes of the capacitance element.

4. The RF powder particle according to claim 1, wherein, in the opposing two electrodes of the capacitance element, the electrode connected to the end of the coil is disposed on the upper face of the insulating film, and the other electrode is disposed on the lower face of the insulating film.

5. The RF powder particle according to claim 1, wherein, in the opposing two electrodes of the capacitance element, the electrode connected to the end of the coil is disposed on the lower face of the insulating film, and the other electrode is disposed on the upper face of the insulating film.

6. The RF powder particle according to claim 1, wherein the substrate is a semiconductor substrate having a surface provided with an insulating layer.

7. The RF powder particle according to claim 1, wherein the substrate is a glass substrate.

8. An RF powder being used in a powdery state and comprising particles each having an inductance element that serves as an antenna and a capacitance element that is connected to the both ends of the inductance element and forms a tank circuit on a substrate, wherein each of the particles is physically bounded by an external surface, and wherein each of the particles is sized and shaped such that the external surface has a surface area of at most 0.3 millimeters squared; and
    wherein an insulating layer is formed on a side of the inductance element, wherein the capacitance element comprises a first electrode, a dielectric film, and a second electrode, wherein the first electrode is disposed between the dielectric film and an insulating surface of the substrate, and wherein the dielectric film is disposed between the first electrode and the second electrode and over the insulating layer.

9. The RF powder according to claim 8, wherein the tank circuit formed by the inductance element and the capacitance element responds to a high-frequency electromagnetic field that is given from outside.

10. An RF powder-containing base comprising an RF powder of which particles each comprising an inductance element that serves as an antenna and a capacitance element that is connected to the both ends of the inductance element and forms a tank circuit on a substrate,
    wherein the particles of the RF powder contained in the base are physically bounded by an external surface,
    wherein the RF powder particles are sized and shaped such that each external surface has a surface area of at most 0.3 millimeters squared, and
    wherein the particles of the RF powder contained in the base respond to the respective electromagnetic fields having different frequencies; and
    wherein an insulating layer is formed on a side of the inductance element, wherein the capacitance element comprises a first electrode, a dielectric film and a second electrode, wherein the first electrode is disposed between the dielectric film and an insulating surface of the substrate, and wherein the dielectric film is disposed between the first electrode and the second electrode and over the insulating layer.

11. The RF powder-containing base according to claim 10, wherein the base is made of paper or plastic.

12. The RF powder-containing base according to claim 11, wherein the base is a bank note.

13. The RF powder particle according to claim 1, wherein the inductance element and the capacitance element are electrically insulated from the substrate.

14. The RF powder particle according to claim 1, wherein an entire outer surface of the RF powder particle is coated in a protective film.

15. The RF powder particle according to claim 1, wherein the insulating surface has a thickness of about 10 μm, and wherein the insulating film has a thickness of about 30 nm.

16. The RF powder according to claim 8, wherein an entire outer surface of the RF powder particle is coated in a protective film.

17. The RF powder according to claim 8, wherein the insulating surface has a thickness of about 10 μm , and wherein the insulating film has a thickness of about 30 nm.

18. The RF powder-containing base according to claim 10, wherein an entire outer surface of the RF powder particle is coated in a protective film.

19. The RF powder-containing base according to claim 10, wherein the insulating surface has a thickness of about 10 μm, and wherein the insulating film has a thickness of about 30 nm.

20. The RF powder particle according to claim 10, wherein the inductance element and the capacitance element are electrically insulated from the substrate.

* * * * *

UNITED STATES PATENT AND TRADEMARK OFFICE
CERTIFICATE OF CORRECTION

PATENT NO. : 8,933,784 B2
APPLICATION NO. : 12/516643
DATED : January 13, 2015
INVENTOR(S) : Furumura et al.

It is certified that error appears in the above-identified patent and that said Letters Patent is hereby corrected as shown below:

On the Title Page, item (57), under "ABSTRACT", in Column 2, Line 10, delete "magnetic filed" and insert -- magnetic field --, therefor.

In the Specification

In Column 1, Line 8, delete "stage application" and insert -- stage application under 35 U.S.C. §371 --, therefor.

In Column 13, Line 6, delete "10 substrate" and insert -- 10 base --, therefor.

In the Claims

In Column 14, Line 53, in Claim 17, delete "about 10 μm ," and insert -- about 10 μm, --, therefor.

Signed and Sealed this
Sixteenth Day of June, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,933,784 B2 | Page 1 of 1 |
| APPLICATION NO. | : 12/516643 | |
| DATED | : January 13, 2015 | |
| INVENTOR(S) | : Furumura et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 817 days.

Signed and Sealed this
Twenty-ninth Day of September, 2015

Michelle K. Lee
*Director of the United States Patent and Trademark Office*